United States Patent
Sugar

(10) Patent No.: US 7,466,960 B2
(45) Date of Patent: Dec. 16, 2008

(54) COGNITIVE SPECTRUM ANALYSIS AND INFORMATION DISPLAY TECHNIQUES

(75) Inventor: Gary L. Sugar, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 526 days.

(21) Appl. No.: 11/217,470

(22) Filed: Sep. 2, 2005

(65) Prior Publication Data

US 2006/0178124 A1 Aug. 10, 2006

Related U.S. Application Data

(60) Provisional application No. 60/684,975, filed on May 27, 2005, provisional application No. 60/651,141, filed on Feb. 8, 2005.

(51) Int. Cl.
*H04B 17/00* (2006.01)
*H04Q 7/20* (2006.01)

(52) U.S. Cl. ............... 455/67.7; 455/226.4; 455/423

(58) Field of Classification Search ..... 455/67.11–67.7, 455/226.1–226.4, 423–425; 702/68, 76, 702/117, 124, 177; 324/76.12, 76.14, 76.19, 324/627–628
See application file for complete search history.

(56) References Cited

U.S. PATENT DOCUMENTS

| | | | |
|---|---|---|---|
| 4,054,785 A | 10/1977 | Lehmann | |
| 4,227,255 A | 10/1980 | Carrick et al. | |
| 4,950,999 A | 8/1990 | Agnello et al. | |
| 5,005,210 A | 4/1991 | Ferrell | |
| 5,353,346 A | 10/1994 | Cox et al. | |
| 5,912,922 A | 6/1999 | Koszarsky et al. | |
| 5,977,913 A | 11/1999 | Christ | |
| 6,130,907 A | 10/2000 | Chen | |
| 6,229,997 B1 | 5/2001 | Addy | |
| 6,233,529 B1 | 5/2001 | Nonaka | |
| 6,332,076 B1 | 12/2001 | Shah et al. | |
| 6,340,928 B1 | 1/2002 | McCurdy | |
| 6,484,111 B1 | 11/2002 | Nara | |

(Continued)

*Primary Examiner*—Lee Nguyen
(74) *Attorney, Agent, or Firm*—Edell, Shapiro & Finnan, LLC

(57) ABSTRACT

A device and method are provided for monitoring and analyzing received over-the-air energy. According to one aspect, a device and method are provided for performing spectrum analysis on the received energy, generating data for displaying one or more plots associated with the analyzed received energy; determining a type of one or more signals occurring from the received energy; and generating data for displaying on the same display screen as said one or more plots, a name for the one or more signals determined to be occurring. Thus, unlike traditional spectrum analyzer devices that show plots or waveforms, the method and device described herein shows plots or waveforms and on the same screen a list of the devices causing those plots or waveforms. In addition, a filter may be applied to the plots or traces whereby plots are displayed for a particular user-specified device determined to be occurring, or a user-specified type or class of devices determined to be occurring. According to another aspect, the monitoring method and device involves performing spectrum analysis on the received energy, displaying one or more plots associated with the receive energy, and in response to determining a graphical user interface element is positioned over or near a display plot, generating data to display the name for the signal or signals causing that plot or waveform.

28 Claims, 13 Drawing Sheets

U.S. PATENT DOCUMENTS

| | | |
|---|---|---|
| 6,493,629 B1 | 12/2002 | Van Bosch |
| 6,584,419 B1 | 6/2003 | Alexander |
| 6,674,403 B2 | 1/2004 | Gray et al. |
| 6,697,013 B2 | 2/2004 | McFarland et al. |
| 6,711,134 B1 | 3/2004 | Wichelman et al. |
| 6,714,605 B2 | 3/2004 | Sugar et al. |
| 6,850,735 B2 | 2/2005 | Sugar et al. |
| 7,035,593 B2 | 4/2006 | Miller et al. |
| 7,110,756 B2 | 9/2006 | Diener |
| 7,116,943 B2 | 10/2006 | Sugar et al. |
| 7,142,108 B2 | 11/2006 | Diener et al. |
| 7,171,161 B2 | 1/2007 | Miller |
| 7,184,777 B2 | 2/2007 | Diener et al. |
| 2003/0123420 A1 | 7/2003 | Sherlock |
| 2003/0198304 A1 | 10/2003 | Sugar et al. |
| 2003/0224741 A1 | 12/2003 | Sugar et al. |
| 2004/0028003 A1 | 2/2004 | Diener et al. |
| 2004/0028123 A1 | 2/2004 | Sugar et al. |
| 2004/0047324 A1* | 3/2004 | Diener ................. 370/338 |
| 2004/0072577 A1 | 4/2004 | Petri et al. |
| 2004/0137915 A1 | 7/2004 | Diener et al. |
| 2004/0156440 A1 | 8/2004 | Sugar et al. |
| 2004/0203826 A1 | 10/2004 | Sugar et al. |
| 2004/0219885 A1 | 11/2004 | Sugar et al. |
| 2005/0073983 A1 | 4/2005 | Diener |
| 2005/0227625 A1 | 10/2005 | Diener |

* cited by examiner

FIG. 11

Devices

| Device | Qty | Start Time | On Time | RF Channels | Duty Cycle | Signal Strength |
|---|---|---|---|---|---|---|
| ⊞ Bluetooth Networks | 2 | Wed Jan-11 12:23 | 11:23 | 1,6 | 33% | -63 dBm |
| ⊞ Cordless Phone Networks | 1 | Wed Jan-11 12:23 | 11:23 | 1 | 33% | -63 dBm |
| ⊞ Unrecognized Devices | 3 | Thu Jan-12 01:11 | 00:22 | 1 | 1% | -75 dBm |
| ⊟ Chirp Transmitters | 2 | Thu Jan-12 02:25 | 01:23 | 1 | 0% | -83 dBm |
|     Chirp Transmitter 1 | 1 | Wed Jan-11 12:20 | 11:21 | 2-6 | 35% | -85 dBm |
|     Chirp Transmitter 2 | 1 | Thu Jan-12 02:22 | 00:06 | 2-6 | 42% | -47 dBm |
|     CW Transmitter | 1 | Thu Jan-12 02:21 | 00:07 | 11 | 100% | -66 dBm |

Tree View / Now (currently active devices)

FIG. 12

Devices

| Device | Network ID | Device ID | Start Time | On Time | RF Channels | Duty Cycle | Signal Strength |
|---|---|---|---|---|---|---|---|
| 802.11 AP | Cognio AP1 | 00:DE:AD:BE:EF:12 | Wed Jan-11 12:23 | 11:23 | 1,6 | 33% | -63 dBm |
| 802.11 AP | Cognio AP2 | 00:98:76:54:32:10 | Wed Jan-11 12:23 | 11:23 | 1 | 33% | -63 dBm |
| 802.11 STA | Cognio AP1 | 00:12:34:56:78:9A | Thu Jan-12 01:11 | 00:22 | 1 | 1% | -75 dBm |
| 802.11 STA | Cognio AP2 | 00:FE:ED:FA:CE:12 | Thu Jan-12 02:25 | 01:23 | 1 | 0% | -83 dBm |
| Bluetooth SCO Master | 123 | 11:22:33:44:55 | Wed Jan-11 12:20 | 11:21 | 6 | 7% | -85 dBm |
| Bluetooth ACL Master | 456 | 22:33:44:55:66 | Thu Jan-12 02:22 | 00:06 | 1-13 | 67% | -47 dBm |
| Bluetooth Slave | 123 | 33:44:55:66:77 | Thu Jan-12 02:21 | 00:07 | 1-13 | 53% | -66 dBm |

List View / Now (currently active devices)

FIG. 13

Devices

| Device | Qty | Start Time | On Time | RF Channels | Duty Cycle | Signal Strength |
|---|---|---|---|---|---|---|
| ⊞ Bluetooth Networks | 2 | Wed Jan-11 12:23 | 11:23 | 1,6 | 33% | -63 dBm |
| ⊞ Cordless Phone Networks | 1 | Wed Jan-11 12:23 | 11:23 | 1 | 33% | -63 dBm |
| ⊟ 802.11 Networks | 3 | Thu Jan-12 01:11 | 00:22 | 1 | 1% | -75 dBm |
| ⊟ Cognio AP1 | 2 | Thu Jan-12 02:25 | 01:23 | 1 | 0% | -83 dBm |
|     00:DE:AD:BE:EF:12 | 1 | Wed Jan-11 12:20 | 11:21 | 2-6 | 35% | -85 dBm |
|     00:98:76:54:32:10 | 1 | Thu Jan-12 02:22 | 00:06 | 2-6 | 42% | -47 dBm |
| ⊞ Cognio AP2 | 1 | Thu Jan-12 02:21 | 00:07 | 11 | 100% | -66 dBm |

Tree View / Now (currently active devices)

COGNITIVE SPECTRUM ANALYSIS AND INFORMATION DISPLAY TECHNIQUES

RELATED APPLICATIONS

This application claims priority to U.S. Provisional Application No. 60/651,141, filed Feb. 8, 2005, to U.S. Patent Application No. 60/684,975, filed on May 27, 2005, the entirety of each of which is incorporated herein by reference.

BACKGROUND OF THE INVENTION

The explosive growth in wireless applications and devices over the past few years has produced tremendous public interest benefits. Wireless networks and devices have been deployed in millions of offices, homes, and more recently, in increasing numbers of public areas. These wireless deployments are forecast to continue at an exciting pace and offer the promise of increased convenience and productivity.

This growth, which is taking place mostly in the unlicensed bands, is not without its downsides. In the United States, the unlicensed bands established by the FCC consist of large portions of spectrum at 2.4 GHz and at 5 GHz, which are free to use. The FCC currently sets requirements for the unlicensed bands such as limits on transmit power spectral density and limits on antenna gain. It is well recognized that as unlicensed band devices become more popular and their density in a given area increases, a "tragedy of the commons" effect will often become apparent and overall wireless utility (and user satisfaction) will collapse. This phenomenon has already been observed in environments that have a high density of wireless devices.

The types of signaling protocols used by devices in the unlicensed bands are not designed to cooperate with signals of other types also operating in the bands. For example, a frequency hopping signal (e.g., a signal emitted from a device that uses the Bluetooth™ communication protocol or a signal emitted from certain cordless phones) may hop into the frequency channel of an IEEE 802.11 wireless local area network (WLAN), causing interference with operation of the WLAN. In addition, other non-communication devices or systems, such as microwave ovens, may emit energy in these unlicensed bands. Thus, technology is needed to exploit all of the benefits of the unlicensed band without degrading the level of service that users expect.

Historically, the wireless industry's general approach to solving "tragedy of the commons" problems has been for manufacturers to simply move to another commons further up the spectrum. This solution, however, is not workable for much longer, due to spectrum scarcity and to the less attractive technical characteristics of the higher bands (decreased signal propagation and the inability to penetrate surfaces).

Enterprise uses of the unlicensed band are focused on larger scale deployment of wireless networks (e.g., WLANs) and integration into wired networks. WLANs can complicate existing network management schemes because they introduce the additional requirement of efficiently managing radio spectrum. Current WLAN systems and management technology are focused on monitoring and managing activity at the network level of the WLAN, but provide little or no capability to monitor the frequency band where signals of multiple types (e.g., communication protocol/network types, device types, etc.) are present.

Spectrum analyzer devices may be used for troubleshooting RF interference and other issues. However, currently available spectrum analyzer devices only display plots or waveforms, with little or no additional information about the received or detected (via an antenna) over-the-air energy.

A more sophisticated, yet easy to use, device is needed to troubleshoot RF interference and other problems by displaying plots and waveforms as well as more specific information about the types of signals determined to be occurring.

SUMMARY OF THE INVENTION

Briefly, a device and method are provided for monitoring and analyzing received over-the-air energy. According to one aspect, a device, method and software are provided for analyzing digital data derived from received over-the-air energy to generate data to display one or more spectrum analysis plots associated with the received energy; determining a type or class of one or more signals present in the received energy from the digital data; and generate data for displaying on the same display screen as said one or more plots a name for one or more signals present in the received energy. Thus, unlike traditional spectrum analyzer devices that show plots or waveforms, the method and device described herein shows plots or waveforms and on the same screen a list of the devices causing those plots or waveforms. In addition, a filter may be applied to the plots or traces whereby plots are displayed for a particular user-specified device determined to be occurring, or a user-specified type or class of devices determined to be occurring. According to another aspect, the monitoring method and device involves performing spectrum analysis on the received energy, displaying one or more plots associated with the receive energy, and in response to determining a graphical user interface element is positioned over or near a display plot, generating data to display the name for the signal or signals causing that plot or waveform.

The objects and advantages of the techniques described herein will become more readily apparent when reference is made to following description taken in conjunction with the accompanying drawings.

BRIEF DESCRIPTION OF THE DRAWINGS

FIGS. 10-13 are examples of a fifth display screen type and its variations for listing the names of signals/devices detected based on the spectrum analysis.

DETAILED DESCRIPTION

Figure 1:
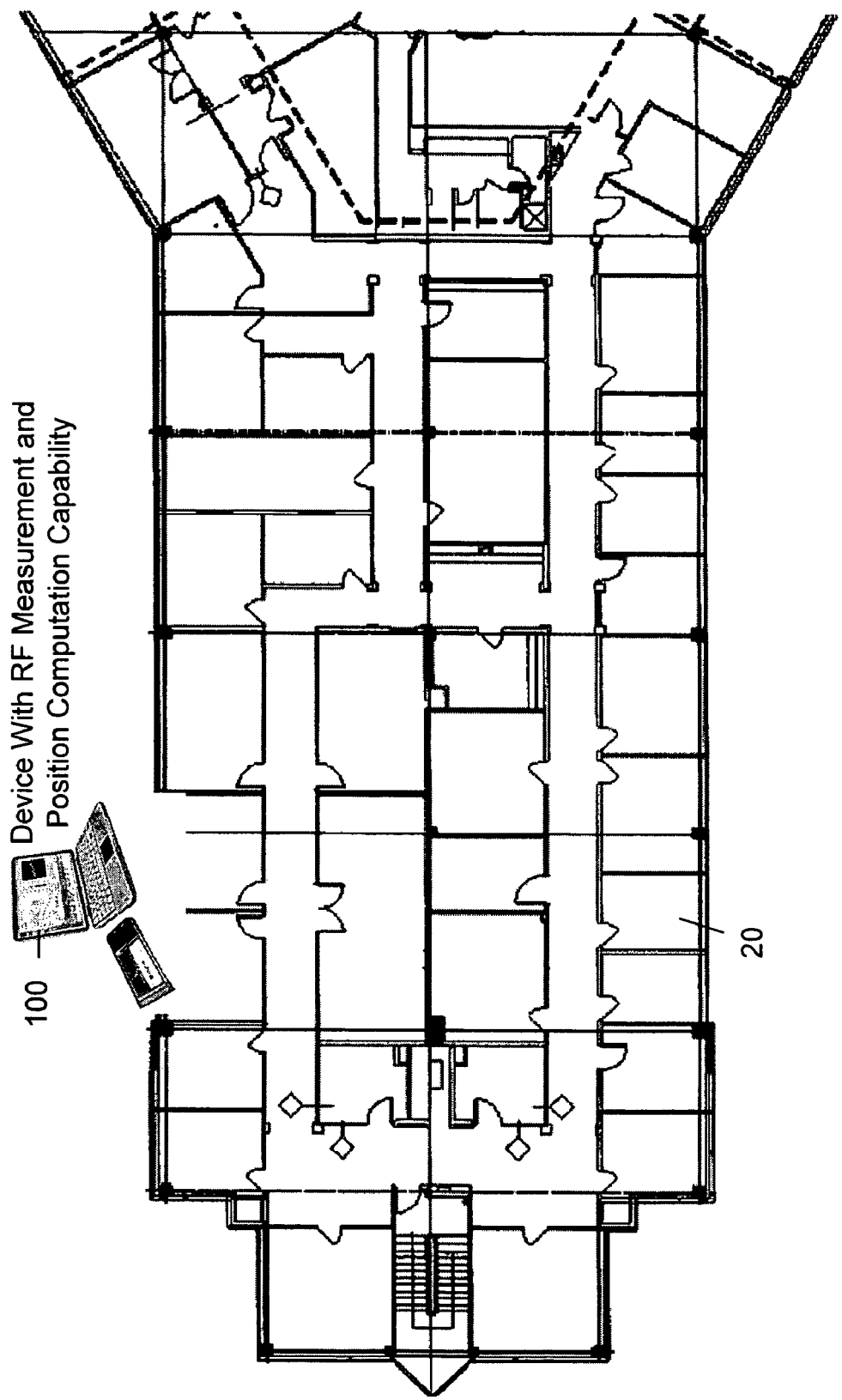
FIG. 1 is diagram showing a radio sensor device capable of, among other things, making spectrum analysis measurements in a region represented by the illustrated map.

Referring first to FIG. 1, a radio sensor device 100 is shown that makes spectrum measurements of energy received in a frequency band or bands with respect to a region of interest represented by the map 20 of a region of interest. The radio sensor device 100 also has the capability of determining a position of one or more sources of energy that it receives. The radio sensor device 100 is described in more detail hereinafter in connection with FIG. 2. The term "interferer" is meant to include RF energy that may conflict in time and frequency with RF signal traffic of a certain communication standard or type. An example of the RF signal traffic is IEEE 802.11 wireless local area network (WLAN) traffic in the 2.4 GHz or 5 GHz bands. Examples of RF energy that would be considered interference to the WLAN traffic include microwave ovens, DECT cordless phone devices, Bluetooth™ devices, wireless video camera devices, infant (video or audio) monitor devices, etc.

Figure 2:
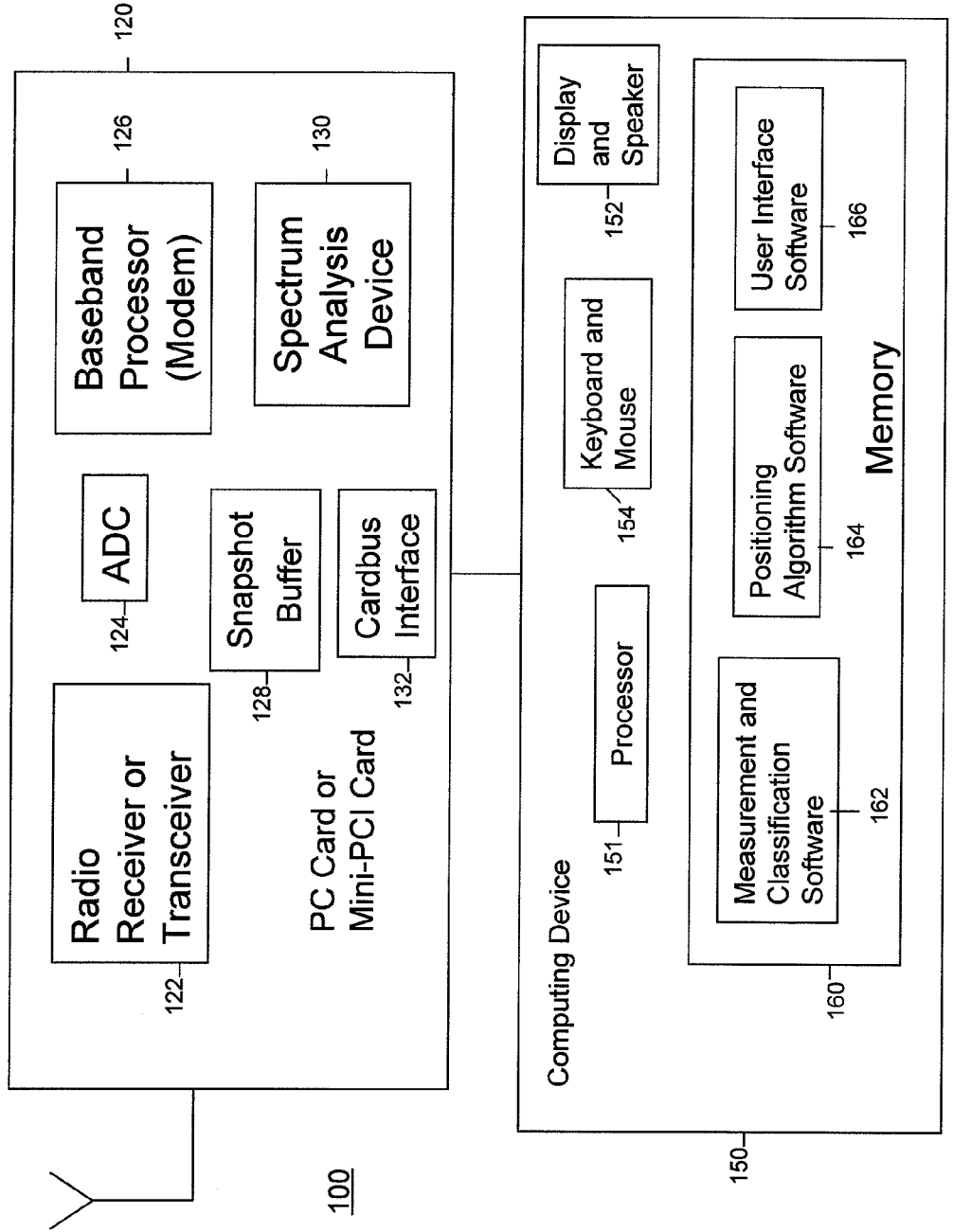
FIG. 2 is a block diagram of the radio sensor device.

An exemplary block diagram of the radio sensor device 100 is shown in FIG. 2. There is an RF processing section 120 and a data processing section 150. These sections may be integrated as part of a computing device, such as a PC, PDA, etc., or the RF processing section 120 may be embodied as a PC or mini-PCI card and the data processing section 150 is a PC device that interfaces (via a Cardbus™ interface) to the RF processing section 120. The RF processing section 120 comprises a radio receiver (or transceiver) 122, analog to digital converter (ADC) 124, baseband processor (e.g., modem) 126, a snapshot buffer 128 for storing digital samples of received downconverted RF energy (not demodulated) and a spectrum analysis device 130. The Cardbus interface is shown at reference number 132. The snapshot buffer 128 stores raw digital samples of RF energy for a time interval. An example of a spectrum analysis device 130 is disclosed in commonly assigned U.S. Pat. No. 6,714,605 B2 and in the following commonly assigned and co-pending U.S. Applications (which are incorporated herein by reference):

| Title | Filing Date | Application Number |
|---|---|---|
| System and Method for Real-Time Spectrum Analysis in a Radio Device | Apr. 22, 2003 | 10/420,511 |
| Pulse Detection Scheme for Use in Real-Time Spectrum Analysis | Aug. 2, 2004 | 10/909,450 |

The data processing section 150 comprises a processor (e.g., a Pentium™ class processor) 151, a display and speaker 152 for displaying data and announcing information to a user, a keyboard and mouse 154 and memory 160 that stores RF measurement and classification software 162, positioning algorithm software 164 to perform a positioning algorithm on RSS data associated with received energy and/or classified signals, and user interface software 166 to perform the various user interface data display techniques described herein.

Examples of signal classification techniques are described in commonly assigned U.S. Patent No. 6,850,735 B2 and in the following commonly assigned and co-pending U.S. Patent Applications (all of which are incorporated herein by reference):

| Title | Filing Date | Application Number |
|---|---|---|
| System and Method for Classifying Signals Occurring in a Frequency Band | Apr. 22, 2003 | 10/420,362 |
| System and Method for Classifying Signals Using Timing Templates, Power Templates and Other Techniques | Jul. 28, 2003 | 10/628,603 |
| Signal Classification Methods for Scanning Receiver and Other Applications | Apr. 22, 2004 | 10/830,414 |
| Improved System Architecture for Real-Time Spectrum Analysis, Signal Classification and Protocol Analysis | Feb. 8, 2005 | 60/651,141 |

A signal is classified by type based on physical layer (L1) and medium access control (MAC) layer (L2/L3) transmission characteristics. Accordingly, examples of signal types are:

1. Bluetooth™ SCO
2. Bluetooth™ ACL
3. Bluetooth™ Inquiry
4. Time Division Duplex (TDD)-1
5. TDD-2
6. IEEE 802.11 access point (AP)
7. IEEE 802.11 station (STA)
8. FM phone
9. Microwave Oven-1
10. Microwave Oven-2
11. DECT Cordless Phone-1
12. DECT Cordless Phone-2

Signal types 1-7, 11 and 12 can be classified based on physical layer and MAC layer transmission characteristics, while signal types 8-10 are classified based on physical layer transmission characteristics alone.

The radio sensor device 100 is also able to classify unrecognized devices, i.e., devices that are not associated with a classification template. An example of such a device is a cordless phone that uses an unrecognized transmission protocol to exchange data over-the-air with its base station (i.e., a phone that does not use Bluetooth, 802.11, 802.11FH, TDD or DECT protocols).

Examples of signals/devices that the radio sensor device can recognize and differentiate are shown in the table below. The user interface will display these devices under the heading "Unrecognized Devices" in the Device View, when Tree View mode is selected, for example.

Unrecognized device signal types

| Pulse Type | Analog or Digital | Modulation Type | Name Shown In Device View | Output Parameters |
|---|---|---|---|---|
| Continuous | Digital | FSK | Continuous FSK Transmitter | RMS power, bandwidth, symbol rate, coarse and fine center frequency (CF), pulse average power (PAP), RMS frequency deviation |
| Continuous | Digital | OFDM | Continuous OFDM Transmitter | RMS power, bandwidth, coarse and Fine CF, symbol duration, FFT size, guard interval duration |

-continued

| Pulse Type | Analog or Digital | Modulation Type | Name Shown In Device View | Output Parameters |
|---|---|---|---|---|
| Continuous | Digital | QAM | Continuous QAM Transmitter | RMS power, bandwidth, symbol rate, coarse and fine CF, PAP |
| Continuous | Analog | FM | FM Transmitter | RMS power, bandwidth, coarse and fine CF, PAP, RMS frequency deviation |
| Continuous | Analog | CW | CW Transmitter | RMS power, coarse and fine CF |
| Burst | Digital | FSK | Burst FSK Transmitter | RMS power, bandwidth, symbol rate, coarse and fine CF, PAP, RMS frequency deviation, burst duration, burst ramp-up time, burst period, periodicity and phase |
| Burst | Digital | FSK-FHSS | Frequency-Hopped FSK Transmitter | RMS power, bandwidth, symbol rate, coarse and fine CF, PAP, RMS frequency deviation, burst duration, burst ramp-up time, burst period, periodicity and phase |
| Burst | Digital | OFDM | Burst OFDM Transmitter | RMS power, bandwidth, coarse and fine CF, symbol duration, FFT size, guard interval duration, burst duration, burst ramp-up time, burst period, periodicity and phase |
| Burst | Digital | QAM | Burst QAM Transmitter | RMS power, bandwidth, symbol rate, coarse and fine CF, PAP, burst duration, burst ramp-up time, burst period, periodicity and phase |
| Burst | Digital | QAM-FHSS | Frequency-Hopped QAM Transmitter | RMS power, bandwidth, symbol rate, coarse and fine CF, PAP, burst duration, burst ramp-up time, burst period, periodicity and phase |
| Burst | Analog | Chirp | Chirp Transmitter | RMS power, frequency span, burst duration, burst ramp-up time, burst period, periodicity and phase |

Techniques for classifying so-called unrecognized devices or signals are disclosed in commonly assigned co-pending U.S. Application No. 60/684,975, filed May 27, 2005, entitled "Discriminating Between Radio Frequency Interferer Signals Detected in a Frequency Band," the entirety of which is incorporated herein by reference.

Figure 3:
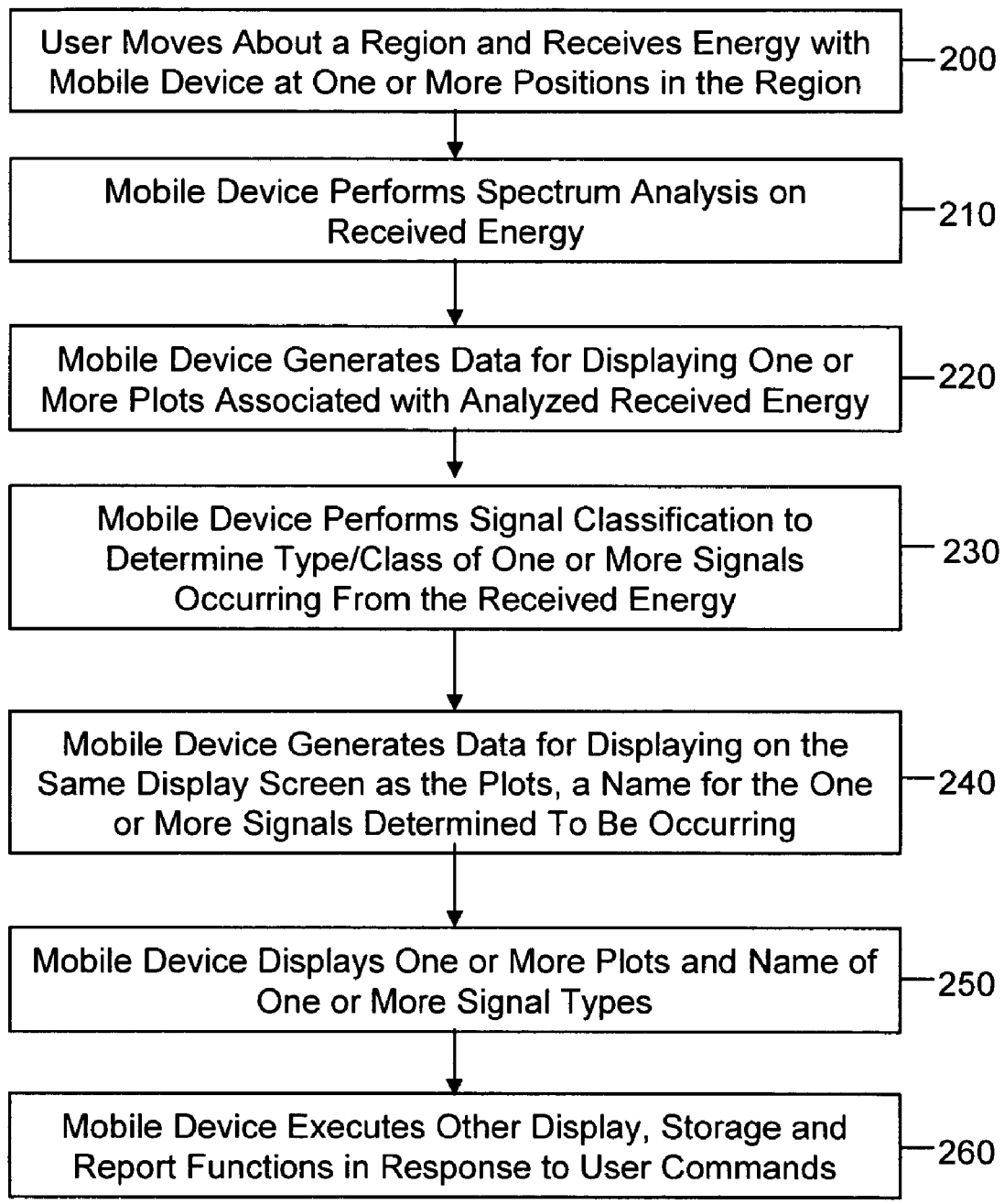
FIG. 3 is a flow chart depicting the operations of the radio sensor device.

With reference to FIG. 3, a general description of the functionality of the radio sensor device 100 is provided, whereas examples of the display data that the radio sensor device generates other features are described hereinafter. In step 200, the user of the radio sensor device 100 may move about to various positions in the region (represented by a map displayed on the radio sensor device) and receive energy at a position. Next, in step 210, the spectrum analysis device in the radio sensor device 100 analyzes the received energy for purposes of generating data to display one or more plots associated with the received energy in step 220, and in order to classify signals in the received energy in step 230. In step 240, based on output of the signal classification function, the radio sensor device generates data for displaying on the same display as the one or more plots, a name for one or more signal type/class determined to be occurring in the received energy. In step 250, the radio sensor device displays on its display screen the one or more plots and the name of the one or more signal types/classes. Additional display, storage and report functions, described hereinafter, are performed in response to user commands in step 260, based on received energy. Examples of these additional features include a spectrum capture, by which the radio sensor device stores a "state of the spectrum" at a particular time and position, in response to a user command. These spectrum captures can then be "replayed" at a later time, saved and email/exported to other devices, used to generate site survey reports, and used in position computation algorithms.

Figure 4:
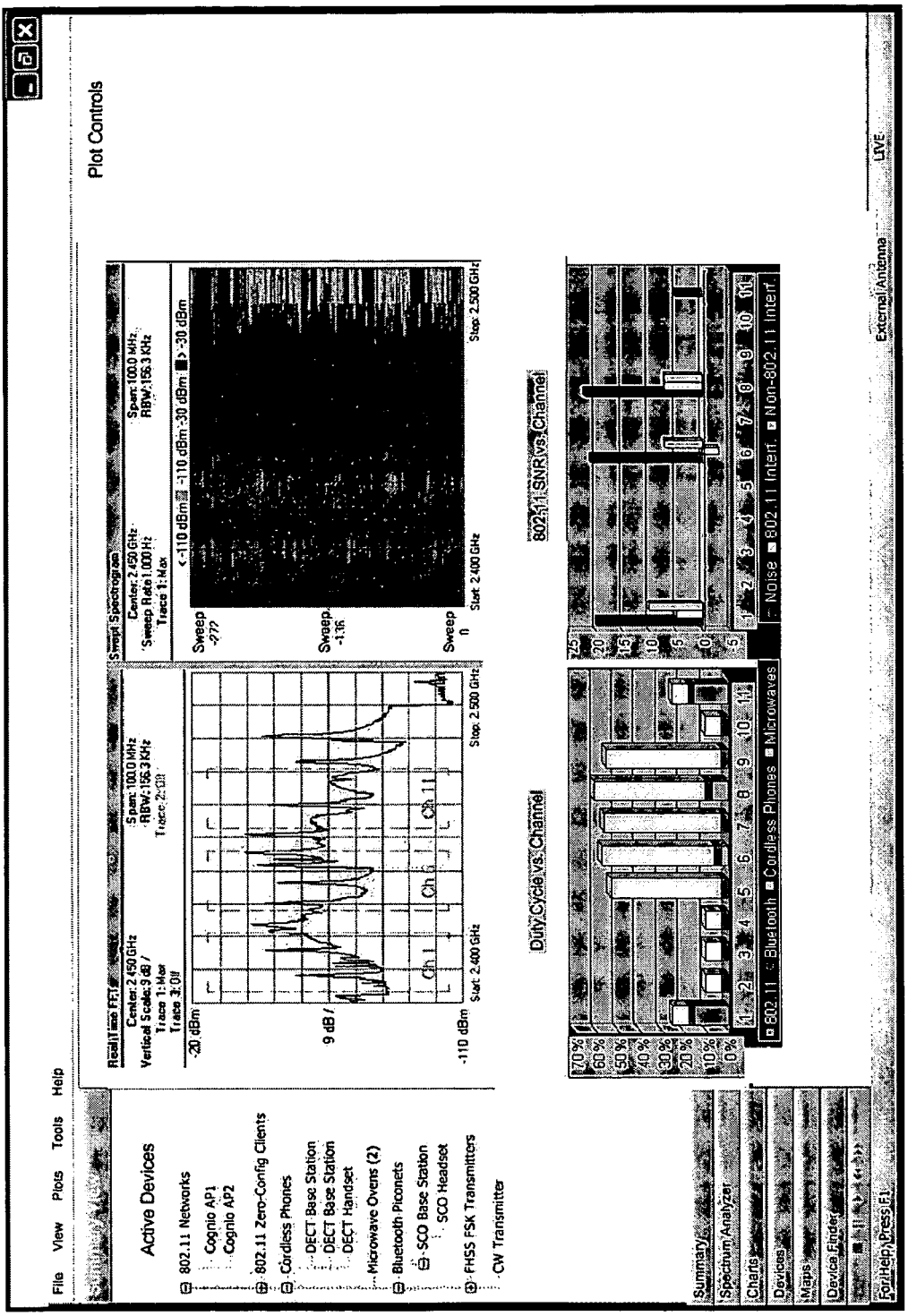
FIG. 4 is an example of a first display screen type on the radio sensor device.
Figure 5:
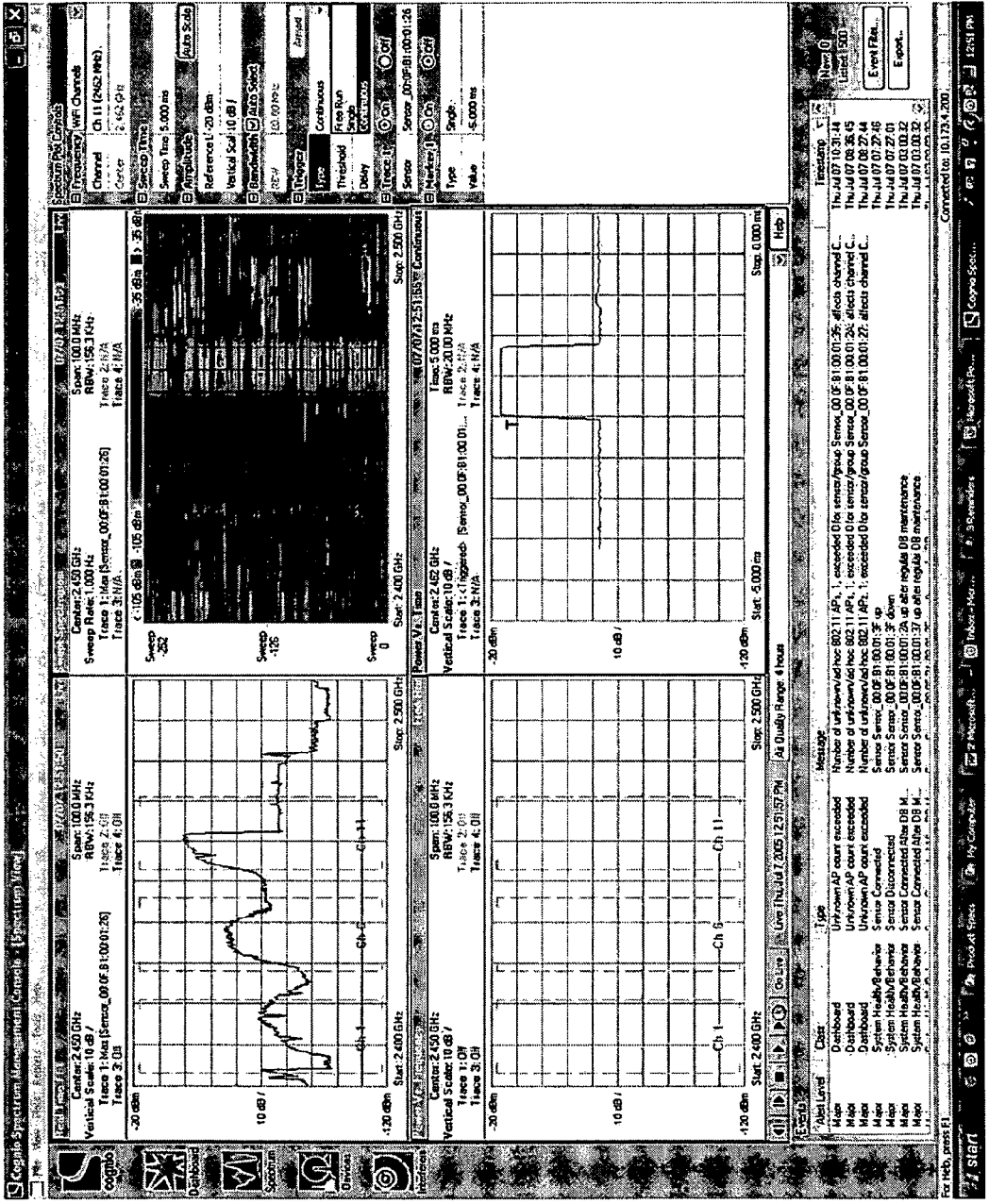
FIG. 5 is an example of a second display screen type.

Turning next to FIG. 4, a first display screen type is shown. This is what is referred to as a Summary View. The Summary View contains summary spectrum information. A goal of this view is to allow a user to solve many problems by looking at a single display screen. As such, the Summary View may be the first display screen to appear after start-up of the radio sensor device 100. The Summary View may contain several plots or traces. One plot is a real-time Fast Fourier Transform (RTFFT) plot. A user can modify the RTFFT plot using the controls as shown in FIG. 5, the Spectrum View. The user may turn the RTFFT plot into a Swept Spectrogram plot if so desired, which is also shown in FIG. 4. There may be default start/stop frequencies for the RTFFT after start-up, such as 2.4/2.5 GHz.

Another plot that may be shown in the Summary View is an FFT Duty Cycle plot. Again, this plot may be turned into a FFT Duty Cycle Swept Spectrogram plot if so desired. The FFT Duty Cycle Swept Spectrogram plot indicates how often the FFT values at a particular frequency exceed a user-defined duty cycle threshold.

Still another Summary View plot is a Duty Cycle vs. Channel plot over all enabled RF channels. This plot is actually in the form of a stacked bar chart that shows the duty cycle contribution from several signal type or device type categories such as 802.11 devices, microwave ovens, cordless phones, Bluetooth™ devices, 802.11 frequency hopping (FH) devices, and "other" (i.e., unrecognized) devices. This chart may be turned into a Duty Cycle vs. time plot showing duty cycle vs. time by class of devices (one trace per device) over a user-selected range of channels. The default channel selection after start-up may be all enabled channels.

Yet another Summary View plot is a SNR vs. Channel plot over all enabled RF channels. This plot may take the form of a bar chart, and indicates the signal-to-noise ratio (SNR) of 802.11 traffic, 802.11 co-channel interference and non-802.11 interference. The user can turn this plot into a SNR vs. time plot to show SNR vs. time over a user-selected range of channels.

A non-exhaustive list of possible chart views and plots are as follows.

Devices vs. Channel

This is a stacked bar chart that shows the number of devices (i.e., signals classified in the received energy) of each type vs. RF channel. This chart is updated periodically. The horizontal axis contains all user-enabled channels.

Devices vs. Time

This is a multi-line plot that shows the number of devices of each type vs. time over a user-selectable range of channels.

Duty Cycle vs. Channel

As indicated above in connection with FIG. 4, this is a stacked bar chart that shows the measured duty cycle in each RF channel, updated periodically, from each of a plurality of device types (signal types). The horizontal axis contains all user-enabled channels.

Duty Cycle vs. Time

This is a multi-line plot that shows the measured duty cycle in a user-selected RF channel, updated periodically. The duty cycle contribution is shown for several device categories, such as those referred to above in connection with the Duty Cycle vs. Channel view.

Pulse Histogram

This is a bar chart in PDF mode or a line plot in CDF mode. It shows a histogram of one of several pulse parameters for a user-specified device or group of devices, updated periodically. Examples of the pulse parameters are: center frequency, power, duration and pulse start time. The user can adjust which display mode (PDF or CDF), the target device or device group and the histogram buffer depth.

802.11 APs/Ad-Hoc vs. Channel

This is a stacked bar chart that shows the number of 802.11 APs and Ad-Hoc networks vs. RF channel, updated periodically. The horizontal axis contains all user-enabled channels.

802.11 APs/Ad-Hoc vs. Time

This is a multi-line plot that shows the number of 802.11 APs and ad-hoc networks in a user-selected RF channel, updated periodically.

802.11 Received Signal Strength vs. Channel

This is a 2-bar chart that shows the received signal strength of the strongest and 2nd strongest APs in each user-enabled channel, updated periodically.

802.11 Received Signal Strength vs. Time

This is a multi-line plot that shows the received signal strength of the strongest and 2nd strongest APs in a user-specified channel, updated periodically.

802.11 SNR vs. Channel

As explained above in connection with FIG. 4, this is a 3-bar chart that shows the signal-to-noise+interference ratios for the strongest 802.11 AP in each user-enabled channel, updated periodically. The information is displayed in a 3-bar chart. The first bar shows the ratio of the RSS from the strongest AP on that channel to the thermal noise power in that channel during the last measurement interval. The second bar shows the ratio of the RSS from the strongest AP on that channel to the RSS from the second strongest AP on that channel during the last measurement interval. The third bar shows the ratio of the RSS from the strongest AP on that channel to the RSS from the strongest interferer in that channel during the last measurement interval.

802.11 SNR vs. Time

This is a multi-line plot that shows the signal-to-noise+ interference ratios for a user-specified AP and channel, updated periodically. The first trace shows the ratio of the RSS from the user-specified AP to the thermal noise power in its RF channel during the last measurement interval. The second and third traces show the ratio of the RSS from the user-specified AP to the RSS from the strongest and second strongest APs on the same channel during the last measurement interval, respectively. The fourth and fifth traces show the ratio of the RSS from the user-specified AP to the RSS from the strongest and second-strongest interferers affecting its channel during the last measurement interval, respectively.

FIG. 5 illustrates a further example of the Spectrum View, where power vs. frequency and power vs. time plots are shown. In addition, FIG. 5 shows along the right side the spectrum plot controls referred to above that allow a user to control parameters associated with certain views.

Figure 6:
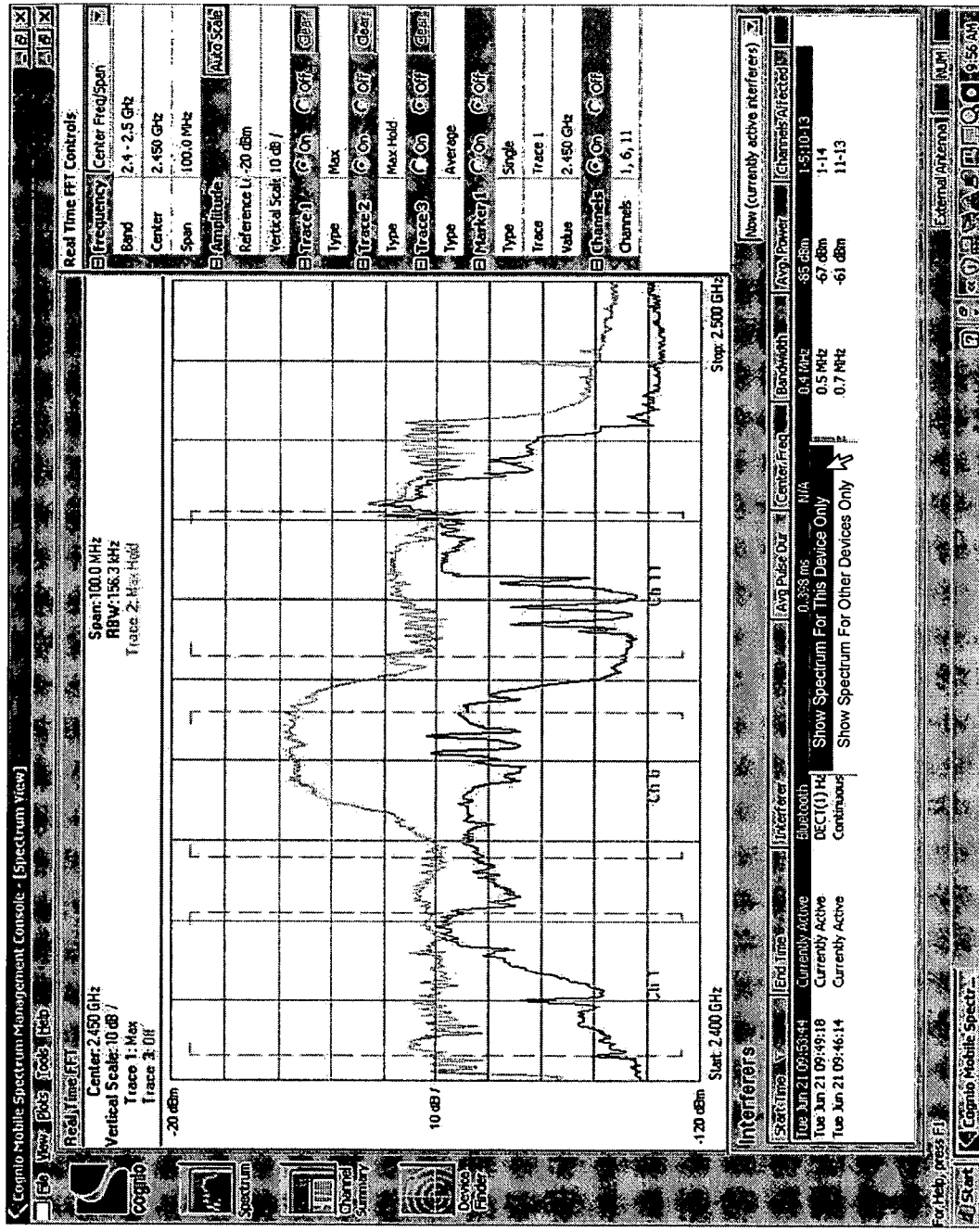
FIGS. 6 and 7 are examples of a third display screen type that shows both waveform plots and signal/device names.

FIG. 6 illustrates a display view where plots are shown associated with radio frequency energy (in the indicated channels) that contains several interferer signals classified as indicated in the "Interferers" sub-window at the bottom of screen. Similarly, in FIG. 7, an FFT duty cycle plot is shown in the indicated channels for the devices/signal types listed in the Interferers sub-window. The Interferers sub-window in FIG. 6 lists 3 currently active interferers: a Bluetooth™ device, a DECT(1) cordless phone and a continuous interferer (e.g., wireless video device). The plots shown in the large sub-window above the Interferers sub-window are RTFFT plots may contain plots for all three of the currently active interferers. Alternatively, the user may click on one of the devices listed in the Interferers sub-window to show the spectrum plots for the corresponding device only, or for the other devices only, or for a group of devices of the same category or type.

Figure 7:
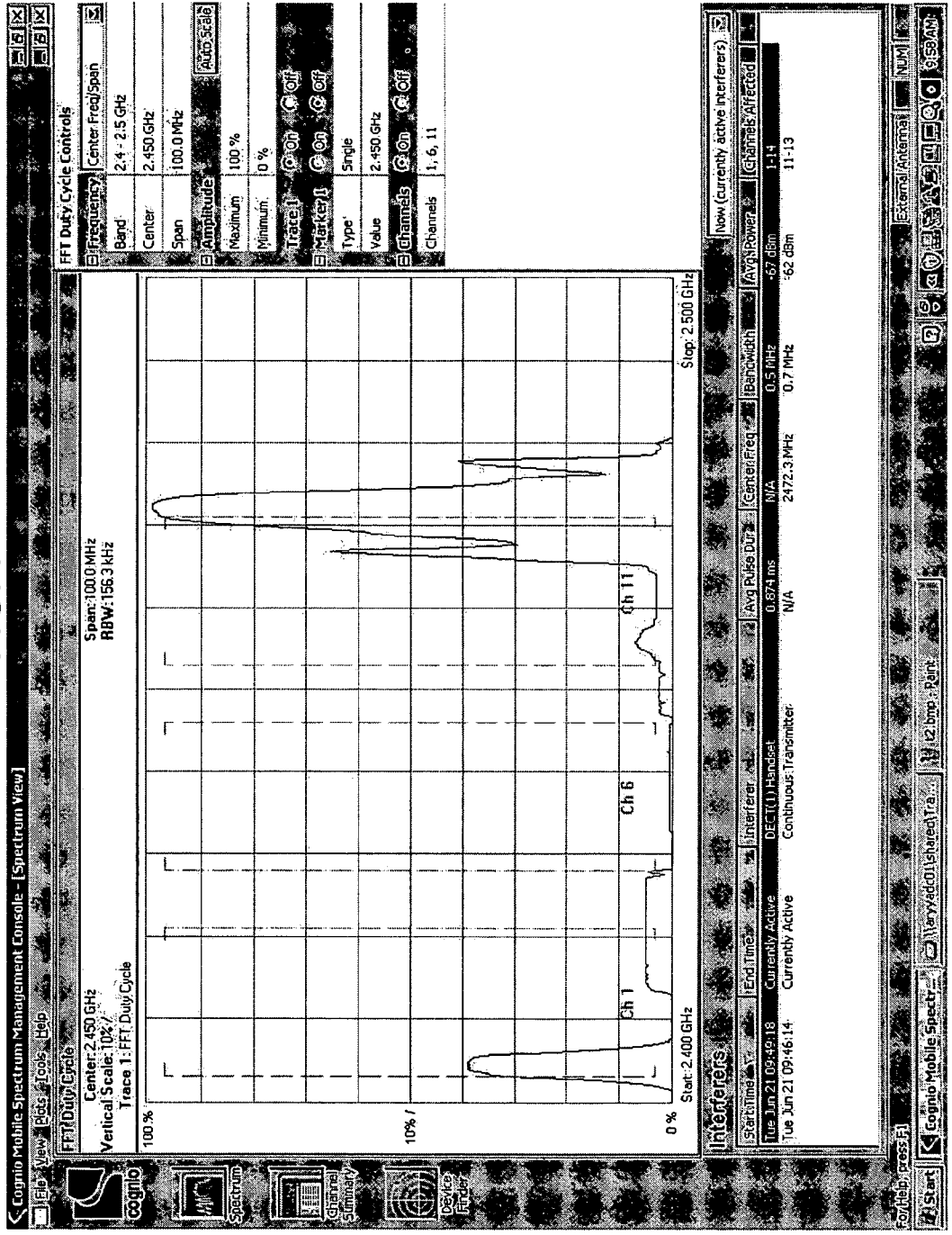
Figure 8:
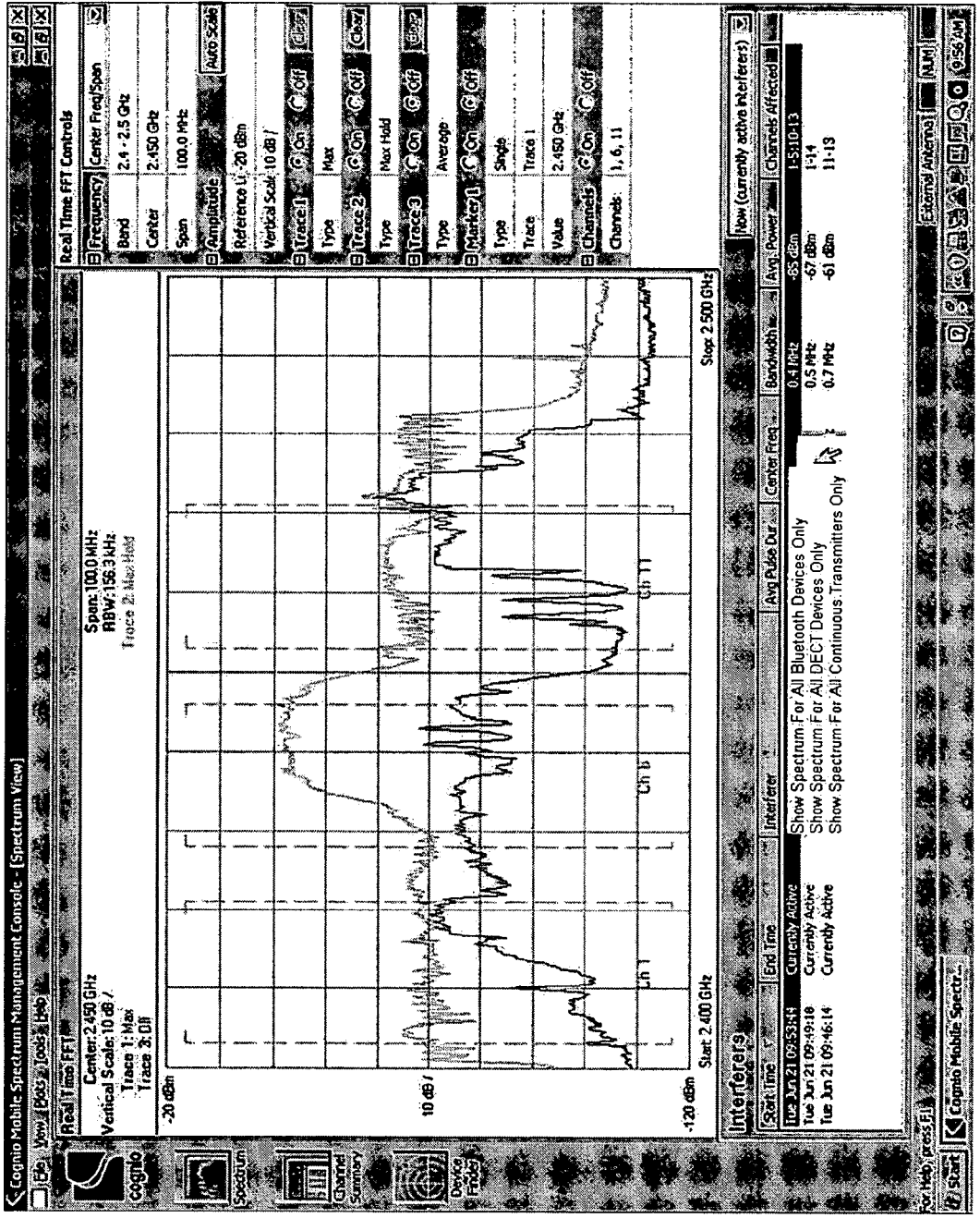
FIG. 8 is an example of modified version of the third display screen type that allows a user to filter the display plots by a particular device or device type.

Similar to FIG. 7, FIG. 8 shows device type-specific spectrum filtering whereby a user can select to display spectrum plots or charts for only a specific class or type of devices determined to be occurring. For example, a user may select to display spectrum plots for all Bluetooth™ devices only that are determined to be occurring in the frequency band.

The device-specific spectrum filtering (FIG. 7) and device type-specific spectrum filtering (FIG. 8) may be achieved by isolating in frequency and time the plots associated with a particular device or device. The user interface software is responsive to a user command to generate data displaying one or more plots for only a particular signal (device-specific spectrum filtering) or type of signals (device type-specific spectrum filtering) determined to be occurring in the received energy.

Figure 9:
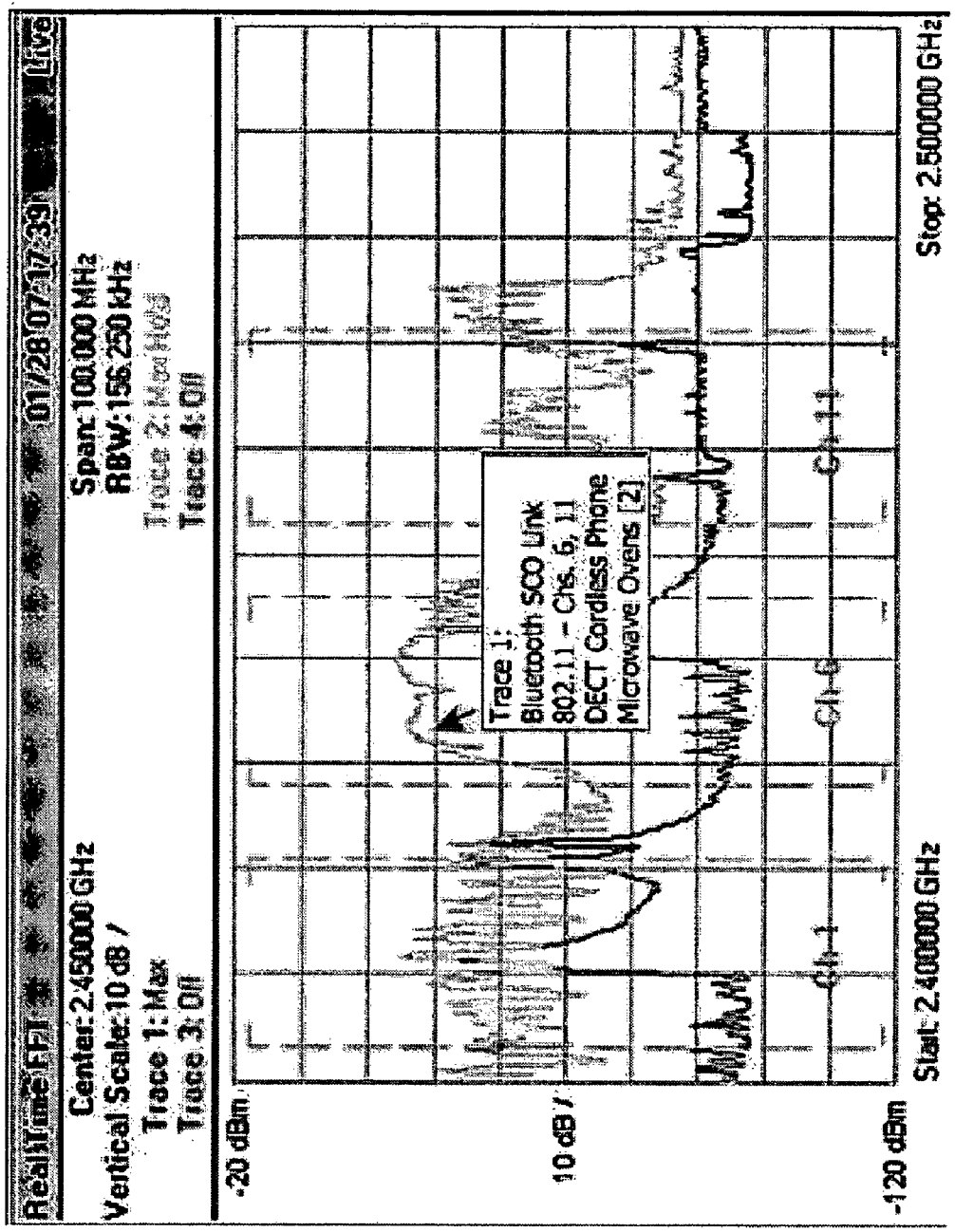
FIG. 9 is an example of a fourth display screen type that shows the name of a signal when a cursor is placed over the corresponding displayed plot.

FIG. 9 illustrates another display/user interface feature for displaying both spectrum plots associated with received radio frequency energy and a name of a signal type determined to be occurring in the received radio frequency energy. According to this feature, when the user moves a cursor (or other graphic element) over a signal plot, the radio sensor device will display the name of the signal type(s) that contribute to that plot. In the example shown in FIG. 9, the cursor is moved or hovered over Trace 1 (max power) and the software in the radio sensor device generates data to display the signal types shown in FIG. 9.

Turning to FIGS. 10-13, a Devices View will be described. The Devices View is capable of displaying detected devices in a more communication standards-agnostic manner. The Devices View shows detailed statistics for each of the active devices determined to be occurring in the received radio frequency energy by the signal classification software in the radio sensor device.

Figure 10:
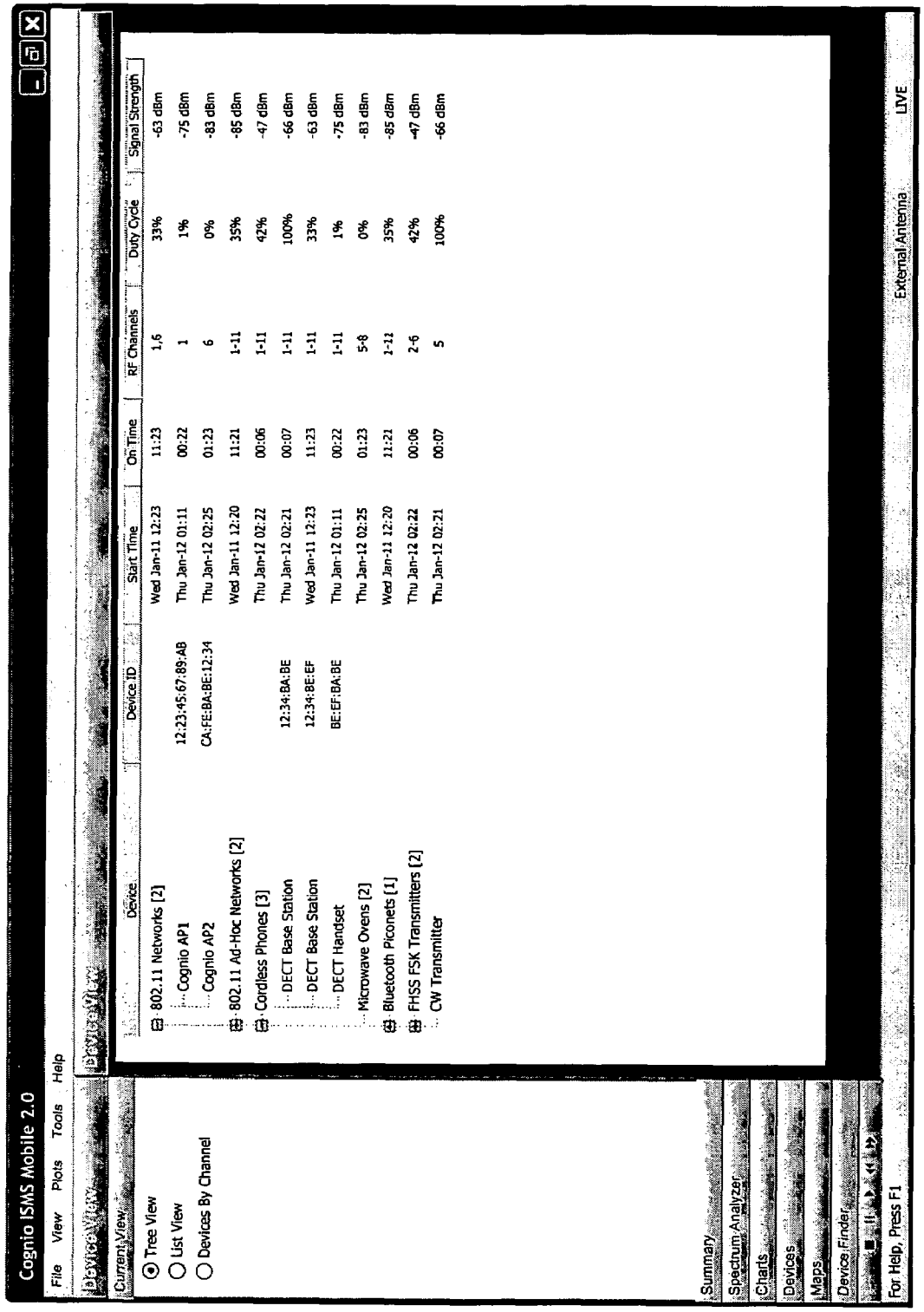

Examples of device types (i.e., signal types) listed in the left-hand most column in FIG. 10 are:
- 802.11 APs and ad-hoc devices
- 802.11 Zero-Config clients
- Non-802.11 devices (e.g., cordless phones, microwaves, etc.)
- Unrecognized Devices Examples of column headings that may be useful in a Devices View are listed in the table below.

| Parameter Name | Description |
| --- | --- |
| Avg. Pulse Duration | Average pulse duration for pulses received from this device |
| Avg. Power | Average received signal strength (log average) for pulses from this device |
| Channels Affected | Channels affected by transmissions from this device |
| Device ID | Device address for this device, if appropriate (e.g., MAC address for 802.11 APs, device address for Bluetooth ™ devices) |
| Duty Cycle | Measured transmit duty cycle for this device |
| Max Power | Max received signal strength (log average) for pulses from this device |
| Max Pulse Duration | Max pulse duration for pulses received from this device |
| Network ID | Network address for this device, if appropriate (e.g., SSID for 802.11, or piconet address for Bluetooth ™ devices) |
| On Time | Amount of time the device has been on |
| Periodic Device | Icon present if periodic device (should be a default column) |
| Periodicity | Number between 0 = Aperiodic and 1.0 = Periodic |
| Pulse Period | Best-fit period for pulses received from this device |
| RMS Phase Jitter | RMS phase jitter in the arrival time of pulses from this device relative to its measured period |
| Start Time | When the device was first detected |

There are three viewing modes in the Devices View: Tree View, List View and Devices by Channel. FIG. 11 illustrates a Tree View where devices in the left hand column are organized hierarchically, first under a device type heading, then under a network master (e.g., AP, base station) heading. Also in FIG. 11, Unrecognized Devices are highlighted and automatically broken out by type as shown. FIG. 12 illustrates a List View where devices are listed in sequence by type but with no hierarchical organization. FIG. 13 illustrates a Tree View where the 802.11 devices are highlighted and automatically hierarchically broken out by AP. The Devices by Channel view mode organizes devices in the left hand column 1 hierarchically, first by RF channel, then by device type, then by network master.

The user interface software in the radio sensor device may provide the user with the ability to add, delete, and reorder columns using any of the column headings listed in the table above.

Figure 14:
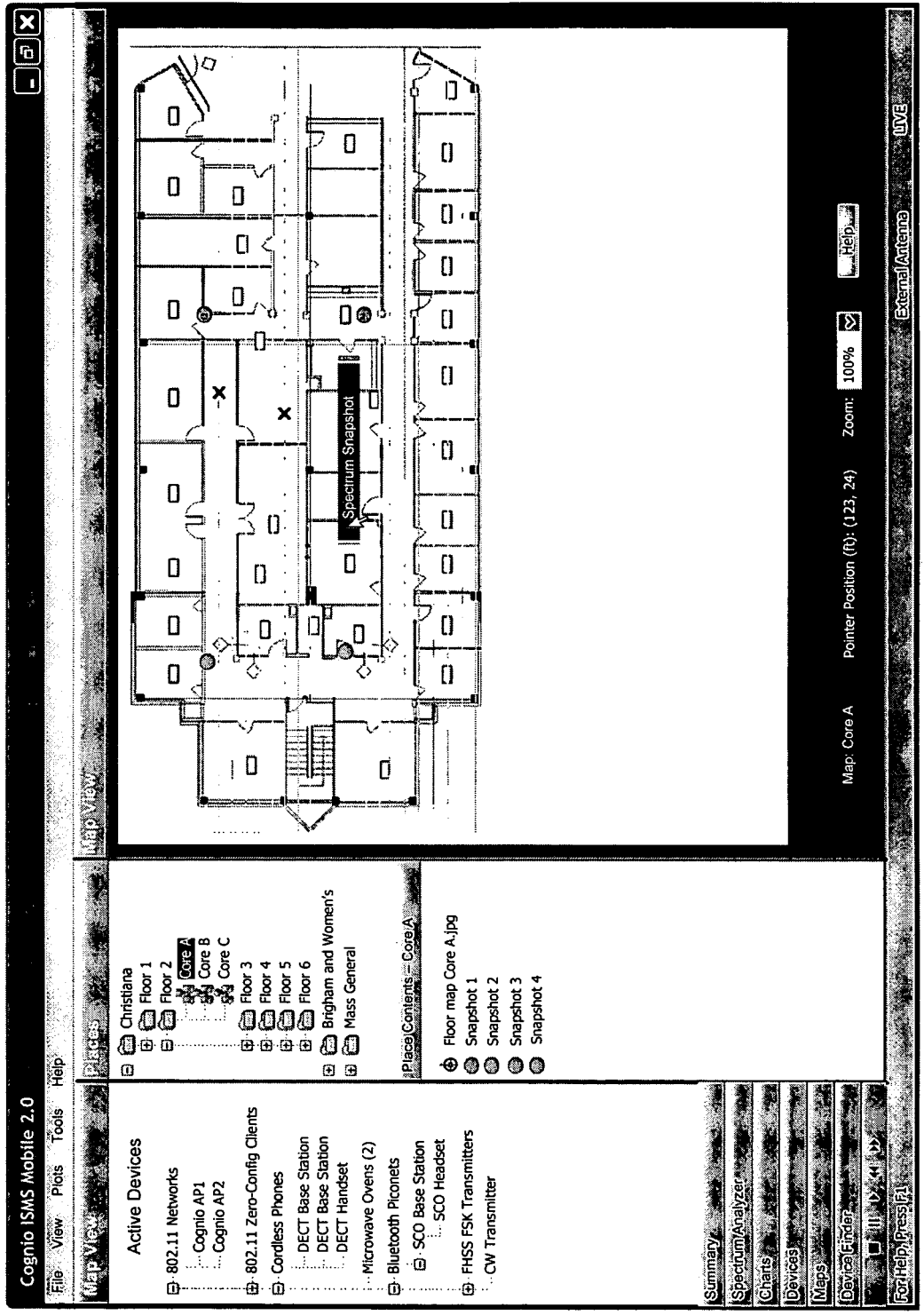
FIG. 14 is an example of a seventh display screen type that shows a map of a region where spectrum monitoring is being performed.

The user interface software in the radio sensor device may be responsive to a user double-clicking on a device to display a pop-up window that shows detailed information for that device. The information includes values for each of the column headings listed in the table above. Turning to FIG. 14, the Map View is described. The Map View allows the user to perform site surveys and determine device positions. The Map View uses the concept of Places to associate points in space with (X,Y) positions on a floor map. A Place is any physical area that can be associated with a floor map, such as a floor of a building, a wing on a floor, an office, etc.

Places can be viewed as container objects (e.g., folders) that store the following information: a floor map file, a scale mapping distance in feet or meters to distance on the map, and spectrum capture files described in more detail hereinafter.

The user interface software in the radio sensor device stores the following information (in a hard disk memory, for example) for each Place so that it is persistent after the application is terminated: floor map file, scale mapping distance in feet or meters to distance on the map, zoom level for the map, spectrum capture files.

Place Folders are provided to allow the user to organize Places hierarchically.

Places and Place Folders may be displayed in a Places explorer panel to the right of the devices navigation pane in the Map View, as shown in FIG. 14. The explorer panel is modeled after Windows Explorer panel with the View Folders option enabled. It is subdivided into two panes. The top pane (the tree pane) shows a tree view of all Places and Place Folders that are stored in the system; the bottom pane (the Place contents pane) shows the floor map file, capture files and device icons associated with the selected Place in the tree pane.

When user selects a Place in the tree pane, the floor map associated with that Place is displayed in the floor map viewing area, and the floor map file, spectrum capture files and device icons are listed in the Place contents pane.

Device icons may be used to represent active 802.11 devices and interferers determined to be occurring in the region represented by the map. These icons may be shown in both the Place contents pane and in the floor map viewing area.

The user interface software will allow a user to create, delete, move or rename a Place or a Place Folder, as well as add, delete or change a floor map for a Place.

The map files can be any image type, such as .gif, .jpg, .bmp, .tiff, etc.

Places, Place Folders, map files and spectrum capture files are visible outside of the radio sensor device software applications. The user can access the Place hierarchy under by pointing to a directory location.

Spectrum Captures allow a radio sensor device user to record spectrum information and play it back at a later time with the user interface software as if it were being viewed live for the first time. Multiple radio sensor device users can exchange Spectrum Capture files to share information on what is happening in the spectrum. Spectrum Captures also serve as a powerful way for radio sensor device users to report issues to a technical support team.

A user may employ any one of the following methods to take a Spectrum Capture through the user interface software in the radio sensor device:

- Click on the "record" button in the record/playback controls.
- Select "Tools->Spectrum Capture . . . " from the pull-down menu.
- Use a hot-key, e.g., Ctrl-C.
- Right-click on a position in a floor map and select "Spectrum Capture . . . ".

After the user directs the user interface software to take a capture, a dialog box appears requesting one or more of the following information:

- Capture duration.
- File name and directory under in which to store the capture file. A chooser may be provided that will give the user the ability to create new Place Folders if necessary during this step. A suitable suggested file name may be provided, e.g., <Place>-<Date>-<Time>.

Each Spectrum Capture one or more of stores the following information to disk:

- Date and time of snapshot.
- User/login name.
- Radio sensor device identification information.
- Place, map and map position of snapshot (if the snapshot was generated by right-clicking on a map)
- List of active devices, plus all information needed to reproduce the Devices View and any of its sub-views and columns during playback
- All data needed to reproduce any of the Summary View plots during playback.
- All data needed to reproduce any of the following Spectrum Analyzer plots during playback:
  - RTFFT plot data
  - Swept Spectrogram plot data
  - FFT Duty Cycle plot data
- All data needed to reproduce any of the following charts during playback:
  - Devices vs. Channel/Time
  - Duty Cycle vs. Channel/Time
  - Pulse Histogram
  - 802.11 APs/Ad-Hocs vs. Channel/Time
  - 802.11 RSS vs. Channel/Time
  - 802.11 SNR vs. Channel/Time
- All information needed to reproduce the appearance of location snapshots and device locations in Map View dynamically during playback.
- State information including:
  - Summary View—Plot settings.
  - Spectrum Analyzer and Chart Views: Plot list and settings.
  - Device View—column configuration and sub-view selection.
  - Map View—Selected place, location snapshot and computed.
  - Device locations shown on the map.

The user interface software allows the user to stop a capture by hitting the stop button in the record/playback controls, and will save any capture info that was recorded up to the time it was stopped.

The Spectrum Capture process in the Map View is described in more detail. When the user right-clicks on a map to generate a capture, a Spectrum Capture icon will appear on the floor map at the user-specified capture position and in the Place contents pane under Map View.

The user may (permanently) change the position of a Spectrum Capture icon on the floor map by dragging it while holding down the left mouse key.

When the user selects a Spectrum Capture icon in the Place contents pane, the associated icon on the floor map is highlighted. The converse is also true, i.e., when the user selects a Spectrum Capture icon on the floor map, the associated icon on the explorer panel is highlighted.

When the user selects a Spectrum Capture icon (in either the map viewing area or the explorer panel) and hits the delete key (or selects delete from an appropriate pull-down menu), the snapshot file is removed from disk and its icons are removed from the Map View.

The user may move a capture file from one place to another by dragging and dropping in the Places explorer panel under Map View.

When the user hovers the mouse cursor over a Spectrum Capture icon (either on a floor map or in the Place contents pane), a variety of information may appear in a tool-tip window.

An "About This Spectrum Capture . . . " menu selection may be provided in the user interface that lists the following information about a spectrum capture file: file name, user/login name, date and time of capture, radio sensor device identification (Cardbus™ serial number, sensor MAC address, etc.), and capture duration. The user can right-click on a Spectrum Capture icon in the user interface and select "Show Info . . . " to get the same information.

A user may employ any one of the following methods to open and play back a Spectrum Capture file from a software application, such as the user interface software on the radio sensor device:

- Select File->Open to open a capture file, then hit the play button in the record/playback controls.
- Double-click on a capture file icon on a floor map or in the Place contents pane under Map View, then hit the play button.
- Double-click on a capture file in Windows Explorer, then hit the play button.
- Right-click on a capture file icon in Map View and select "load this capture file", then hit the play button.

The user may hit the stop button to stop the capture playback, or pause to freeze playback. The user may hit the "Go Live" button to terminate capture/playback activity at any time and return to displaying live spectrum info from the sensor. The user can select how to view the data during playback in much the same way it is done with the user interface software in "live" mode. More specifically, RTFFT, FFT Duty Cycle, and Swept Spectrogram plots may be invoked. Any combination of the charts referred to above also may be displayed. Active devices appear in the device navigation pane and Devices View and update dynamically just as they did when the data was recorded live. Position snapshot icons and device icons update dynamically on the Map View just as they did during the live capture.

In addition, during playback the user interface software will display following information about a capture file: date and time of snapshot, radio sensor device identifier from which the snapshot was taken, user/login name of the person that initiated the snapshot, the Place and position on the map it was taken.

Site Survey Reports

The user may direct the user interface software to generate a site survey report for a user-specified Place or Place Folder. The site survey report contains information similar to the Spectrum Capture, and more. If a Place Folder is selected, all Places appearing underneath the selected Place Folder in the Places hierarchy may appear in the report. The output format for the site survey report is, for example, HTML.

Any one or more of the following information is included in each site survey report:

Place.

Snapshot date and time.

Floor map location (show a zoomed out picture of the floor map with an "x" or an icon representing the capture position).

Spectrum plot(s) at the time of the capture. The user can select among the following: RTFFT Plot, FFT duty cycle plot, swept spectrogram plot (either FFT or duty cycle). list of active devices and their spectrum information (e.g., RSSI, duty cycle, center frequency, channels affected, etc.), channel summary table, plot of active devices on map.

To summarize, the site survey report involves storing a variety of spectrum-related data for a user specified position in a region. The data may include map data for displaying an image of a map of said region and having an indication representing said user specified position where said data is captured in said region.

Figure 15:
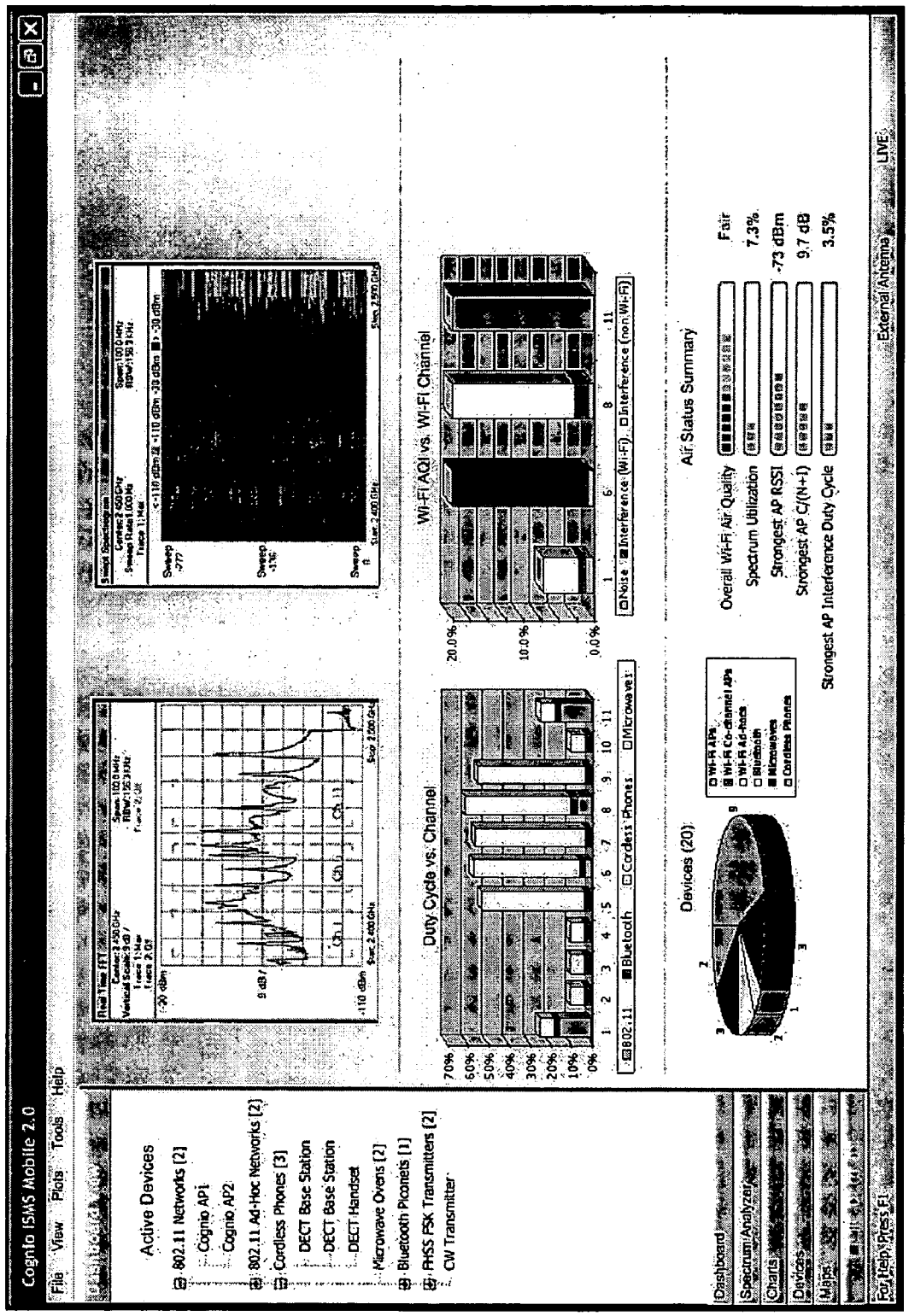
FIG. 15 is a diagram of still another display view that combines multiple display features shown in the other figures.

FIG. 15 illustrates an example of a view called a Dashboard view. This display view combines features of the device view on the left side, together with plots, bar charts, pie charts and measurement bars shown in the main panel. The Wi-Fi™ AQI vs. Wi-Fi Channel bar chart indicates the contributions of noise, Wi-Fi interference and non-Wi-Fi™ interference in each of several Wi-Fi channels. The pie-chart indicates the relative contribution of all the devices (or types of devices) detected in Wi-Fi APs, Wi-Fi co-channel APs, Wi-Fi ad-hoc devices, Bluetooth™ devices, microwave ovens and cordless phones.

In sum, a method is provided for monitoring energy received over-the-air, comprising: performing spectrum analysis on the received energy; generating data for displaying one or more plots associated with the analyzed received energy; determining a type of one or more signals present in the received energy; and generating data for displaying on the same display screen as said plots a name for each of the one or more signals.

In addition, a method is provided for monitoring energy received over-the-air, comprising: performing spectrum analysis on the received energy; displaying one or more plots associated with the analyzed received energy; in response to determining that a graphical user interface element is positioned over or near a displayed plot, generating data to display the name for the one or more signals causing the plot.

Similarly, a method is provided for analyzing energy received in a frequency band, comprising: performing spectrum analysis on the received energy; generating data for displaying one or more plots associated with the analyzed received energy; determining a type of one or more signals occurring in the received energy; generating data for displaying on the same display screen as said plots, a name for each of the one or more signals; and wherein in response to a user command, said (b) generating comprises generating data for displaying one or more plots for only a particular signal or particular type of signals determined to be occurring in the received energy.

Moreover, a method is provided for monitoring radio frequency energy received over-the-air in a frequency band, comprising: performing spectrum analysis on the received energy; displaying one or more plots associated with the analyzed received energy; determining a type of one or more signals present in the received energy; and displaying on the same display screen as said plots a name for the one or more signals.

A radio device is provided comprising a receiver that receives energy detected over-the-air by an antenna; an analog-to-digital converter that converts an output of the receiver to digital data; a processor coupled to the analog-to-digital converter that is programmed to: analyze the digital data to generate data to display one or more spectrum analysis plots associated with the received energy; determine a type of one or more signals present in the received energy from the digital data; and generate data for displaying on the same display screen as said plots a name for the one or more signals present in the received energy.

A processor readable medium is provided that stores instructions that, when executed by a processor, cause the processor to: analyze digital data derived from received over-the-air energy to generate data to display one or more spectrum analysis plots associated with the received energy; determine a type of one or more signals present in the received energy from the digital data; and generate data for displaying on the same display screen as said plots a name for one or more signals present in the received energy.

The system and methods described herein may be embodied in other specific forms without departing from the spirit or essential characteristics thereof. The foregoing embodiments are therefore to be considered in all respects illustrative and not meant to be limiting.

What is claimed is:

1. A method for monitoring energy received over-the-air, comprising:
   a. performing spectrum analysis on the received energy;
   b. generating data for displaying one or more plots associated with the analyzed received energy;
   c. determining a type of one or more signals present in the received energy; and
   d. responsive to a cursor or other graphical interface element being positioned over or proximate a displayed plot, generating data for displaying a name for each of the one or more signals that contributes to that displayed plot.

2. The method of claim 1, and further comprising displaying one or more plots associated with the analyzed received energy and displaying on the same display screen as said one or more plots a name for the one or more signals determined to be occurring.

3. The method of claim 2, and further comprising responding to a user command to display one or more plots associated only with a particular type of signal.

4. The method of claim 3, and further comprising responding to a user command to select the particular type of signal for which the one or more plots only are to be displayed.

5. The method of claim 2, and further comprising responding to a user command to display one or more plots associated only with a particular class or type of signals.

6. The method of claim 5, and further comprising responding to a user command to select the particular group of signals for which the one or more plots only are displayed.

7. The method of claim 1, wherein (c) determining comprises analyzing one or more characteristics derived from said spectrum analysis to classify one or more signals contained in the received energy.

8. The method of claim 1, wherein (d) generating comprises generating data for presenting a list of names for the one or more signals.

9. The method of claim 8, wherein (d) generating comprises generating data to display the names in a tree view format, wherein signals of similar types or similar network types are grouped together.

10. The method of claim 8, wherein (d) generating comprises generating data to display the names sorted by source device type.

11. The method of claim 8, wherein (d) generating comprises generating data to highlight certain names so that they stand out from other names.

12. The method of claim 1, wherein (d) generating comprises generating data for signal names in a list format, the data include one or more of: start time, time duration that signal is on, identifier of channel where occurring, duty cycle and signal strength.

13. The method of claim 1, wherein (c) determining comprises determining that the received energy contains one or more unrecognized signals when one of a plurality of known signal types cannot be matched to data derived from the received energy.

14. The method of claim 13, wherein (d) generating comprises generating data indicating that an unrecognized signal type is detected.

15. The method of claim 14, wherein (d) generating comprises generating text data describing at least one characteristic for an unrecognized signal type.

16. The method of claim 1, wherein (b) generating comprises generating data for one or more of: power versus frequency plot, power versus time plot, duty cycle versus frequency plot and spectrogram plot and real-time Fast Fourier Transform (FFT) plot.

17. The method of claim 1, wherein (b) generating comprises generating data for displaying, with respect to one or more channels in the frequency band, data indicating one or more of: duty cycle, average power, maximum power, number of interferer signals detected, maximum power of detected interferer, interferer duty cycle.

18. The method of claim 1, and further comprising, in response to a user command, storing to a file at least one of: (a) said data for displaying one or more plots associated with the analyzed received energy, and (b) data for displaying a name for each of the one or more signals, for a time interval specified by a user.

19. The method of claim 18, wherein storing comprises storing said file in a format suitable for sharing across computers and networks.

20. The method of claim 18, and further comprising at a later time opening said file with a software application to display the one or more plots associated with the analyzed received energy for said time interval as if it were being monitored live.

21. The method of claim 18, and further comprising displaying a map representing a region in which energy in the frequency band is being received, wherein said storing is responsive to receiving a user command positioning a cursor or other graphical user interface element at a position on the map that corresponds to the approximate position of a device that is receiving and analyzing energy in said region.

22. The method of claim 18, wherein storing comprises storing said data for a user specified position in a region, and wherein said data includes map data for displaying an image of a map of said region and having an indication representing said user specified position where said data is captured in said region.

23. The method of claim 22, wherein storing data comprises storing a list of names for one or more signals determined to be occurring in said region and plots for received radio frequency energy associated with said one or more signals.

24. A method for monitoring energy received over-the-air, comprising:
   a. performing spectrum analysis on the received energy;
   b. displaying one or more plots associated with the analyzed received energy;
   c. in response to determining that a graphical user interface element is positioned over or near a displayed plot, generating data to display the name for the one or more signals contributing to the displayed plot.

25. The method of claim 24, wherein (c) generating comprises generating data to display the name for the signal corresponding to that plot at a position on a display screen proximate the displayed plot.

26. A radio device comprising:
   a. a receiver that receives energy detected over-the-air by an antenna;
   b. an analog-to-digital converter that converts an output of the receiver to digital data;
   c. a processor coupled to the analog-to-digital converter that is programmed to:
      i. analyze the digital data to generate data to display one or more spectrum analysis plots associated with the received energy;
      ii. determine a type of one or more signals present in the received energy from the digital data;
      iii. generate data for displaying on the same display screen as said plots a name for the one or more signals present in the received energy; and
      iv. respond to a graphical user interface element being positioned over or near a displayed plot to generate data for displaying a name for one or more signals contributing to the plot.

27. The device of claim 26, and further comprising a display that is coupled to the processor to display the one or more plots and a name for the one or more signals present in the received energy.

28. A processor readable medium storing instructions that, when executed by a processor, cause the processor to:
   a. analyze digital data derived from received over-the-air energy to generate data to display one or more spectrum analysis plots associated with the received energy;
   b. determine a type of one or more signals present in the received energy from the digital data;
   c. generate data for displaying on the same display screen as said plots a name for one or more signals present in the received energy; and
   d. respond to a graphical user interface element being positioned over or near a displayed plot to generate data for displaying a name for one or more signals contributing to the plot.

* * * * *